US011005772B2

(12) United States Patent
Ros-Giralt et al.

(10) Patent No.: US 11,005,772 B2
(45) Date of Patent: May 11, 2021

(54) SYSTEMS AND METHODS FOR PROVIDING LOCKLESS BIMODAL QUEUES FOR SELECTIVE PACKET CAPTURE

(71) Applicant: Reservoir Labs, Inc., New York, NY (US)

(72) Inventors: Jordi Ros-Giralt, Newport Beach, CA (US); Alan Commike, San Jose, CA (US); Peter Cullen, New York, NY (US); Richard A. Lethin, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 32 days.

(21) Appl. No.: 16/189,489

(22) Filed: Nov. 13, 2018

(65) Prior Publication Data

US 2019/0149477 A1  May 16, 2019

Related U.S. Application Data

(60) Provisional application No. 62/584,272, filed on Nov. 10, 2017.

(51) Int. Cl.
*H04L 12/869* (2013.01)
*H04L 12/861* (2013.01)
(Continued)

(52) U.S. Cl.
CPC .............. *H04L 47/58* (2013.01); *H04L 47/30* (2013.01); *H04L 47/521* (2013.01); *H04L 49/9031* (2013.01)

(58) Field of Classification Search
CPC ....... H04L 47/58; H04L 47/30; H04L 47/521; H04L 49/9031
See application file for complete search history.

(56) References Cited

U.S. PATENT DOCUMENTS

| 2004/0042508 A1* | 3/2004 | Menzel | H04W 72/14 370/522 |
| 2007/0136555 A1* | 6/2007 | Sinclair | G06F 12/0246 711/203 |
| 2014/0219287 A1* | 8/2014 | Birke | H04L 47/29 370/412 |

OTHER PUBLICATIONS

Alberto Leon-Garcia, "Probability, Statistics, and Random Processes for Electrical Engineering", 3rd Editition (833 pages).
(Continued)

*Primary Examiner* — Gbemileke J Onamuti
(74) *Attorney, Agent, or Firm* — Goodwin Procter LLP

(57) ABSTRACT

In a network system, an application receiving packets can consume one or more packets in two or more stages, where the second and the later stages can selectively consume some but not all of the packets consumed by the preceding stage. Packets are transferred between two consecutive stages, called producer and consumer, via a fixed-size storage. Both the producer and the consumer can access the storage without locking it and, to facilitate selective consumption of the packets by the consumer, the consumer can transition between awake and sleep modes, where the packets are consumed in the awake mode only. The producer may also switch between awake and sleep modes. Lockless access is made possible by controlling the operation of the storage by the producer and the consumer both according to the mode of the consumer, which is communicated via a shared memory location.

28 Claims, 8 Drawing Sheets

(51) Int. Cl.
*H04L 12/835* (2013.01)
*H04L 12/873* (2013.01)

(56) References Cited

OTHER PUBLICATIONS

Vern Paxon, "Bro: A System for Detecting Network Intruders in Real-Time", Jan. 1998 (22 pages).
Ros-Giralt, et al., "Lockless Has Tables wiht Low False Negatives", 2014 (6 Pages).
Ros-Giralt, et al. "High-Perfomance Many-Core Networking: Design and Implementation", 2015 (7 pages).
Ros-Giralt, et al., "Multiresolution Priority Queues and Applications", 2017 (10 pages).

\* cited by examiner

Lockless 1-producer 1-consumer queue

```
1  typedef struct {
2    volatile unsigned int offset_p;
3    volatile unsigned int offset_c;
4    packet_t* vector[RINGSIZE];
5  } ring_t;
6
7  void enqueue(ring_t* ring, packet_t* pkt) {
8    next_offset_p = ring->offset_p + 1 % RINGSIZE;
9    while(next_offset_p == ring->offset_c);    // Process stalls
10   ring->vector[ring->offset_p] = pkt;
11   ring->offset_p = next_offset_p;
12 }
13
14 packet_t* dequeue(ring_t* ring) {
15   if(ring->offset_p == ring->offset_c)
16   return NULL;    //  No packet is retrieved
17   current_offset_c = ring->offset_c;
18   ring->offset_c = ring->offset_c + 1 % RINGSIZE;
19   return(vector[current_offset_c]);
20 }
```

FIG. 5

Lockless 1-producer 0-consumer queue

```
1  typedef struct {
2     unsigned int offset_p;
3     unsigned int offset_c;
4     packet_t* vector[RINGSIZE];
5  } ring_t;
6
7  void enqueue(ring_t* ring, packet_t* pkt) {
8     next_offset_p = ring->offset_p + 1 % RINGSIZE;
9     if(next_offset_p == ring->offset_c)
10       dequeue(ring);
11    ring->vector[ring->offset_p] = pkt;
12    ring->offset_p = next_offset_p;
13 }
14
15 packet_t* dequeue(ring_t* ring) {
16    if(ring->offset_p == ring->offset_c)
17    return NULL;
18    current_offset_c = ring->offset_c;
19    ring->offset_c = ring->offset_c + 1 % RINGSIZE;
20    return(vector[current_offset_c]) ;
21 }
```

FIG. 6

Lockless bimodal queue using request/acknowledgment (LBQ1)

```
1  typedef struct {
2     volatile unsigned int offset_p;
3     volatile unsigned int offset_c;
4     volatile bool req; // owned by consumer
5     volatile bool ack; // owned by producer
6     packet_t* vector[RINGSIZE];
7  } ring_t;
8
9  void enqueue(ring_t* ring, packet_t* pkt) {
10    next_offset_p = ring->offset_p + 1 % RINGSIZE;
11    if(!ring->req) {
12       if(ring->ack)
13          ring->ack = false;
14       if(next_offset_p == ring->offset_c)
15          dequeue(ring);
16    }
17    else {
18       if(!ring->ack)
19          ring->ack = true;
20       while(next_offset_p == ring->offset_c);// Producer stalls
21    }
22    ring->vector[ring->offset_p] = pkt;
23    ring->offset_p = next_offset_p;
24 }
25
```

FIG. 7A

Lockless bimodal queue using request/acknowledgment (LBQ1) (Cont'd.)

```
26  packet_t* dequeue(ring_t* ring) {
27      if(ring->offset_p == ring->offset_c)
28          return NULL;
29      current_offset_c = ring->offset_c;
30      ring->offset_c = ring->offset_c + 1 % RINGSIZE;
31      return(vector[current_offset_c]);
32  }
33
34  void start_c(ring_t* ring) {
35    ring->req = true;
36    while(!ring->ack); // Stall until producer acknowledges
37  }
38
39  void stop_c(ring_t* ring) {
40    ring->req = false;
41    while(ring->ack);  // Stall until producer acknowledges
42  }
```

FIG. 7B

Lockless bimodal queue using CAS (LBQ2)

```
1  typedef struct {
2    volatile unsigned int offset_p;
3    volatile unsigned int offset_c;
4    volatile bool trans; // Used to transition modes
5    volatile bool state; // True, consumer is ON;
                          // False consumer is OFF
6    packet_t* vector[RINGSIZE];
7  } ring_t;
8
9  void enqueue(ring_t* ring, packet_t* pkt) {
10   next_offset_p = ring->offset_p + 1 % RINGSIZE;
11   while(!cas(&ring->trans, false, true)); // producer stalls
12   if(!ring->state) {
13     if(next_offset_p == ring->offset_c)
14       dequeue(ring);
15   }
16   else
17     while(next_offset_p == ring->offset_c);
18   ring->trans = false;
19   ring->vector[ring->offset_p++] = pkt;
20   ring->offset_p = next_offset_p;
21 }
22
```

FIG. 8A

Lockless bimodal queue using CAS (LBQ2) (Cont'd.)

```
23  packet_t* dequeue(ring_t* ring) {
24    if(ring->offset_p == ring->offset_c)
25       return NULL;
26    current_offset_c = ring->offset_c;
27    ring->offset_c = ring->offset_c + 1 % RINGSIZE;
28    return(vector[current_offset_c] ) ;
29  }
30
31  void start_c(ring_t* ring) {
32    while(!cas(&ring->trans, false, true));  // consumer stalls
33    ring->state = true;
34    ring->trans = false;
35  }
36
37  void stop_c(ring_t* ring) {
38    while(!cas(&ring->trans, false, true));  // consumer stalls
39    ring->state = false;
40    ring->trans = false;
41  }
```

FIG. 8B

SYSTEMS AND METHODS FOR PROVIDING LOCKLESS BIMODAL QUEUES FOR SELECTIVE PACKET CAPTURE

CROSS-REFERENCE TO RELATED APPLICATIONS

This application claims benefit of priority to U.S. Provisional Patent Application Ser. No. 62/584,272 entitled "Systems and Methods for Providing Lockless Bimodal Queues for Selective Packet Capture," filed on Nov. 10, 2017, the contents of which are incorporated herein by reference in their entirety.

FIELD OF THE INVENTION

This disclosure generally relates to networking systems and methods and, in particular, to systems and methods that facilitate efficient selective processing of certain identified packets from a packet stream.

BACKGROUND

System wide optimization of network components such as routers, firewalls, or network analyzers is a complex problem, as it involves the proper orchestration of several (e.g., tens, hundreds, or even more) different processes and data structures that are interrelated in subtle ways. In these highly dynamic systems, bottlenecks can quickly shift from one component to another forming a network of micro-bottlenecks. This makes it challenging to determine which system components should be optimized, and the degree to which they should be optimized, to get an extra unit of performance.

Moreover, these shifting micro-bottlenecks are interconnected in peculiar ways so that optimizing one of them can sometimes lead to an overall degradation of performance. This is due to internal system nonlinearities such as those found in hierarchical memory architectures. For instance, while optimizing the transfer of packets from the wire to the application is known to be critical, in the limit, pushing too many packets to the application can be detrimental. The reason is, pushing the packets that may eventually need to be dropped because the application may become congested, can cause a net negative effect by thrashing the processors' local caches, increasing the overall cache miss ratios and, hence, decreasing the overall system performance.

Bottlenecks are often encountered in producer-consumer type network systems that are discussed below. In networking systems in general, the packets received at a node are typically analyzed and, thereafter, they may be consumed and/or forwarded to another node, or may be dropped. For example, if the node is a user device such a computer, tablet, or a smart phone, the packets may be consumed, for example, by rendering a web page, audio, video, etc., or the packets may be stored on the user device for later use. If the node is a router, the packets are typically forwarded to an appropriate destination node, which can be another router, a user device, or a server. If the node is a firewall, packets deemed harmful or those that need to be blocked may simply be dropped, and the other packets may be forwarded to a user device or a server, or to a router. A node can also be a dedicated network analyzer node that performs tasks such as intrusion detection, virus detection, malware detection, etc. Here again, the packets deemed harmful may be dropped, and the other packets may be forwarded to another node, such as a user device, a server, or a router. As opposed to using a dedicated node, the functions of a network analyzer may be implemented by another node.

The analysis of received packets can be performed in a single step/stage but, often, the analysis is performed in two or more steps/stages. For example, in the context of intrusion detection, a decision as to whether to drop or forward a packet may simply be made by identifying the source or origin of the packet. In particular, it may be readily decided that a packet should be dropped without further analysis if that packet were received from a source designated as malicious. Conversely, it may be readily decided without further analysis that a packet is to be forwarded to its destination, if the source of the packet is a trusted source. For other packets, however, further analysis, in addition to the identification of the source or origin of the packet, may be needed in order to determine whether those packets pose a threat or are safe.

In general, the more the analysis of packets to be performed, the longer the time needed to analyze the packet. As such, the need for a thorough packet analysis can create a bottleneck in a network, especially in high-speed networks processing packets at the rates of hundreds of megabits or a few, tens, or hundreds of gigabits per second. The two or multi-step/stage packet analysis can alleviate this problem to some extent, in light of the fact that network traffic is often non-uniform and includes bursts of packets. One process/processor (that may be called a producer stage/process or producer) can perform only a limited, partial packet analysis and, if further analysis is needed, that process/processor would simply place the packet in a queue. Another process/processor (that may be called a consumer stage/process or consumer) can retrieve the packets from the queue, and perform additional processing, as needed.

This solution also presents some challenges, however. First, the size of the queue must be large enough to accommodate a burst of packets that may be received at the maximum or peak packet arrival rate. A queue of arbitrarily large size can be implemented in software but, generally, a software implementation is slower than a hardware-implemented queue, and can become a bottleneck. A hardware-implemented queue, on the other hand, has a fixed size and a queue of an inadequate size can also become a bottleneck. In either case, packets may need to be dropped.

Second, because two different processes/processors need to access the queue, in order to avoid a potential corruption of the queue due to simultaneous access by two processes/processors, the queue must be locked such that only one process can access the queue at a certain time. This increases the operational overhead and, as such, the processing delay. Furthermore, if the producer needs to add one or more packets to the queue but if the queue is locked by the consumer, the producer may be forced to drop those packets. On the other hand, once the consumer has consumed all the packets in the queue, it must wait for the producer to add new packet(s) to the queue. As such, in one session in which the consumer has locked the queue, the number of packets the consumer can consume can be no more than the size of the queue, which can adversely affect the overall performance of the system.

Third, the solution described above assumes that the producer and consumer are always active, and that the producer would only place those packets in the queue that the consumer would consume (e.g., analyze and, thereafter, discard, forward, render, and/or store the packets). Enforcing these two requirements can impose a processing burden on the network system, and can become a bottleneck.

SUMMARY

Due to the various sources of bottleneck, and the interdependence thereof, optimizing network performance generally should be a meticulous process, requiring making small but safe steps that can avoid the pitfall of pursuing short term gains that can lead to a new and bigger bottleneck down the path. For the producer-consumer type network systems, the techniques described herein can mitigate one or more of the problems that are identified above. Specifically, various embodiments discussed below feature a queue or a storage structure of a limited or fixed size that can be implemented in hardware, though it can also be implemented in software. The size may be selected so as to improve the overall system performance. Moreover, the queue/storage structure can be operated in a lockless manner, where the producer and the consumer communicate with each other via one or more shared memory locations, and can access the queue/storage simultaneously. The lockless operation can avoid or at least minimize the need to stall one process while the other one is accessing the queue/storage structure, which can avoid or minimize the associated bottlenecks.

Importantly, the various embodiments discussed below also relax the conventional requirement that the producer and the consumer both always be active. Instead, the consumer can transition between an inactive sleep mode and an active wake-up mode. The consumer may consume packets in the queue/storage structure only in the wake-up mode and, in the sleep mode, the consumer does not consume any packets in the queue/storage structure. This allows for the consumption of only the selected packets in a succeeding consumer stage. Moreover, the producer need not determine or know prior to adding the packet(s) to the queue/storage structure that those packet(s) would be consumed by the consumer. Relaxing this determination can improve, e.g., speed-up the producer's performance.

Independently of adding the packets to the queue/storage structure, the producer may determine whether certain packets added to the queue require a further analysis and, accordingly, determine whether the consumer that would perform such further analysis should be in the sleep mode or wake-up mode. A processor/process other than the producer may also make this determination. Upon such a determination, the consumer can transition between the two modes, as needed, but without locking the queue/storage structure. Because only some but not all packets in the queue/storage structure may be consumed by the consumer, this technique is called Selective Packet Capture (SPC).

Because the queue size is constrained to improve system performance, and because the consumer does not consume any packets in the sleep mode, the queue/storage structure may become full, as the producer adds packets thereto. In a conventional producer-consumer system, the producer would simply stall when the queue/storage is full or the storage/queue may become corrupt if the consumer is not always active. In various embodiments described below, rather than stalling the producer when the storage/queue is full because the consumer is in the sleep mode, the producer is configured to pseudo-consume (i.e., retrieve and discard) or overwrite the packets that were previously added to the queue. These different features of the various embodiments, including the lockless, simultaneous operation of both the producer and the consumer, allow the consumer, when it is awake, to consume any number of packets, as long as the producer continues to add packets to the queue/storage structure. The number of packets consumed by a consumer in a one awake session can be greater than, even be a multiple of, the size of the queue/storage structure. These features can thus improve the performance of the producer and consumer processes and of the overall network system.

Accordingly, in one aspect, a method for selectively consuming packets in a packet stream. The method includes receiving by a consumer in a sleep mode a wake-up signal to transition to an awake mode and, in response alerting a producer, via a shared memory location accessible to both the consumer and the producer, that the consumer has entered the awake mode. The method also includes retrieving and consuming by the consumer at least one unconsumed packet from a lockless storage structure accessible to both the consumer and the producer if the structure includes one or more unconsumed packets, while allowing the producer simultaneous access to the storage structure. Otherwise, the method includes providing by the consumer a signal indicating that the storage structure contains no unconsumed packets. The method also includes simultaneously inserting by the producer one or more new packets into one or more empty locations in the storage structure if the storage structure is not full, and otherwise stalling insertion of the one or more new packets.

In some embodiments, the method further includes receiving by the consumer an acknowledgment from the producer to the alert, and the retrieving and consuming steps are performed by the consumer only after receiving the acknowledgment. The method may include determining whether the storage structure contains one or more unconsumed packets.

In some embodiments, the method further includes receiving by the consumer a sleep signal and, in response alerting the producer, via the shared memory location, that the consumer has entered the sleep mode. In these embodiments, the method also includes inserting by the producer one or more new packets into one or more empty locations in the storage structure if the storage structure is not full and, otherwise, inserting the one or more new packets into one or more occupied locations in the storage structure.

Inserting one or more new packets into one or more occupied locations in the storage structure may include retrieving and discarding by the producer one or more packets from the one or more occupied locations. Alternatively, inserting one or more new packets into one or more occupied locations in the storage structure may include overwriting one or more previously inserted packets in the one or more occupied locations.

Consuming one or more unconsumed packets may include one or more of: processing, forwarding, or storing one or more unconsumed packets. The storage structure may include a storage ring. In some embodiments, the storage structure includes a limited size storage structure, having a size from 1 kilobytes up to 10 gigabytes. The number of unconsumed packets retrieved and consumed by the consumer after the wake-up signal is received and before subsequently receiving any sleep signal can be greater than the size of the storage structure.

In some embodiments, a producer location index and a consumer location index are associated with the storage structure, and the method may include determining by the producer, using the producer location index and the consumer location index, whether the storage structure is full. Alternatively or in addition, the method may include determining by the consumer, using the producer location index and the consumer location index, whether the storage structure contains an unconsumed packet.

In various embodiments, the shared memory location includes a mode flag indicating whether the consumer is awake or sleeping. Only the consumer may be configured to modify the mode flag, and the producer may be configured only to read the mode flag. The shared memory location may also include an acknowledgment flag indicating whether the producer is aware of whether the consumer is awake or sleeping. Only the producer may be configured to modify the acknowledgment flag, and the consumer may be configured only to read the acknowledgment flag. The shared memory location may include a flag that indicates: (i) a mode transition of the producer between awake and sleep modes of the producer, and/or (ii) a mode transition of the consumer between awake and sleep modes of the consumer. The flag being controlled via a hardware-implemented, atomic compare-and-swap operation.

In another aspect, a system is provided for selectively consuming packets in a packet stream. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to execute a producer process and a consumer process simultaneously.

According to the consumer process, the processing unit is programmed to receive in a sleep mode of the consumer process a wake-up signal to transition to an awake mode and, in response to alert the producer process, via a shared memory location accessible to both the consumer and the producer processes, that the consumer process has entered the awake mode. The consumer process also programs the processing unit to retrieve and consume at least one unconsumed packet from a lockless storage structure accessible to both the consumer and the producer processes if the structure includes one or more unconsumed packets, while allowing the producer process simultaneous access to the storage structure. The consumer process also programs the processing unit to provide a signal indicating that the storage structure contains no unconsumed packets, if the structure does not include any unconsumed packets.

The instructions program the processing unit to execute the producer process simultaneously with the consumer process, where the producer process programs the processing unit to insert one or more new packets into one or more empty locations in the storage structure if the storage structure is not full, and otherwise to stall the insertion of the one or more new packets. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to execute a producer process and a consumer process simultaneously.

According to the consumer process, the processing unit is programmed to receive in a sleep mode of the consumer process a wake-up signal to transition to an awake mode and, in response to alert the producer process, via a shared memory location accessible to both the consumer and the producer processes, that the consumer process has entered the awake mode. The consumer process also programs the processing unit to retrieve and consume at least one unconsumed packet from a lockless storage structure accessible to both the consumer and the producer processes if the structure includes one or more unconsumed packets, while allowing the producer process simultaneous access to the storage structure. The consumer process also programs the processing unit to provide a signal indicating that the storage structure contains no unconsumed packets, if the structure does not include any unconsumed packets.

The instructions program the processing unit to execute the producer process simultaneously with the consumer process, where the producer process programs the processing unit to insert one or more new packets into one or more empty locations in the storage structure if the storage structure is not full, and otherwise to stall the insertion of the one or more new packets. In various embodiments, the instructions can program the processing unit to perform one or more of the method steps described above.

BRIEF DESCRIPTION OF THE DRAWINGS

In the following description, various embodiments of the present invention are described with reference to the following drawings, in which:

FIG. 5 lists an embodiment of a process for accessing the storage/queue of FIGS. 3 and 4 without locking the storage/queue when the producer and the consumer are both always active;

FIG. 6 lists an embodiment of a process for accessing the storage/queue of FIGS. 3 and 4 without locking the storage/queue when the consumer is always inactive;

FIGS. 7A-7B list an embodiment according to the described invention of a process for accessing the storage/queue of FIGS. 3 and 4 without locking the storage/queue when the producer is always active and the consumer transitions between active/awake and inactive/sleep modes; and FIGS. 8A-8B list an embodiment according to the described invention of a process for accessing the storage/queue of FIGS. 3 and 4 without locking the storage/queue when the producer and the consumer may both transition between active/awake and inactive/sleep modes.

DETAILED DESCRIPTION

Figure 1:
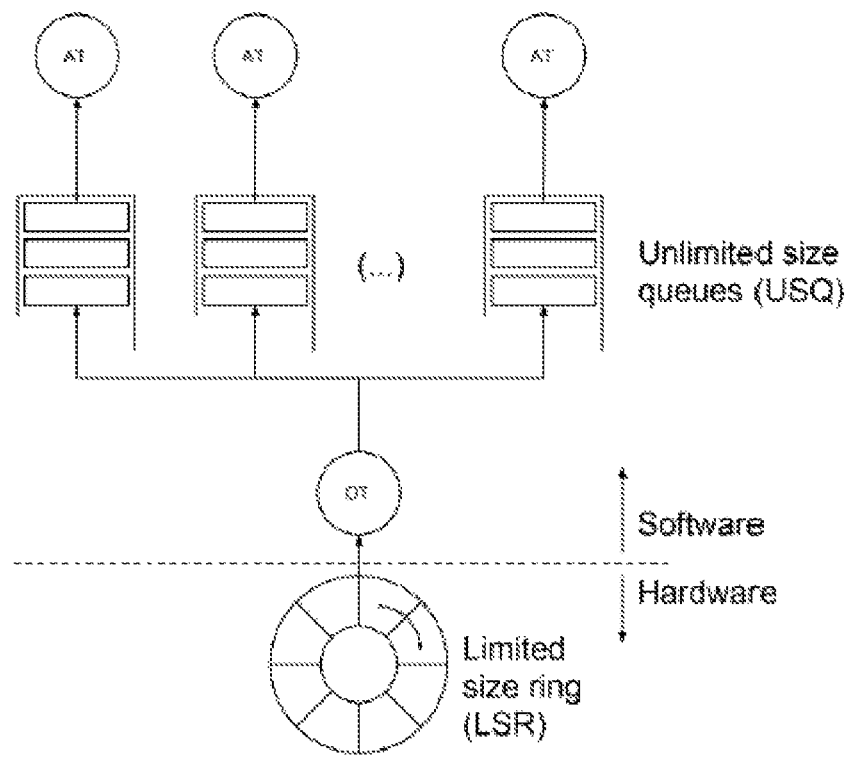
FIG. 1 depicts an embodiment of a network system in which the arriving packets are dispatched by a software-implemented dispatcher to different applications, where each application maintains a queue of the packets received by that application.

With reference to FIG. 1, in a typical network system, the arriving packets are received in a small, fixed size, but fast hardware storage structure, such as a limited size ring (LSR). In this context, "limited size" generally means a fixed size. Such a storage structure/LSR may have tens or a few hundred buffers, where the size of each buffer may be a few kilobytes (e.g., 32 K, 64 K, etc.) of packets. A dispatcher, implemented in software via a dispatcher thread (DT), may retrieve each packet from the storage structure, determine the destination thereof, and forward the packet to an application corresponding to the intended destination, where the application would analyze and/or consume the packet. The dispatcher is generally designed to operate at the peak packet-arrival rate without dropping the arriving packets. The peak packet-arrival rate can be tens or hundreds of megabytes per second (Mbps) or a few, tens, or hundreds of gigabytes per second (Gbps).

Each application, executed via at least one application thread (AT), then consumes the packet received from the dispatcher. Consuming a packet generally means one or more of analyzing, processing, modifying, discarding, forwarding, rendering, and/or storing the packet. The packet consumption rate of a typical AT can be less than the peak packet arrival rate. Therefore, the DT may place the packets destined for a particular application/AT in a queue implemented in software at the node where the application/AT is executed. Due to its implementation in software, such a queue can have an unfixed, dynamically adjustable, i.e., unlimited size. In this context, unlimited does not mean limitless because the software implementation of a queue at a node would ultimately also be limited by the size of the total volatile and non-volatile memory available at the node. Rather, an "unlimited size queue (USQ)" generally means a queue having a size that can be selected and/or adjusted by the application/AT that uses the queue. The USQ can hold the packets received from the DT until the AT is ready to consume those packets.

Figure 2:
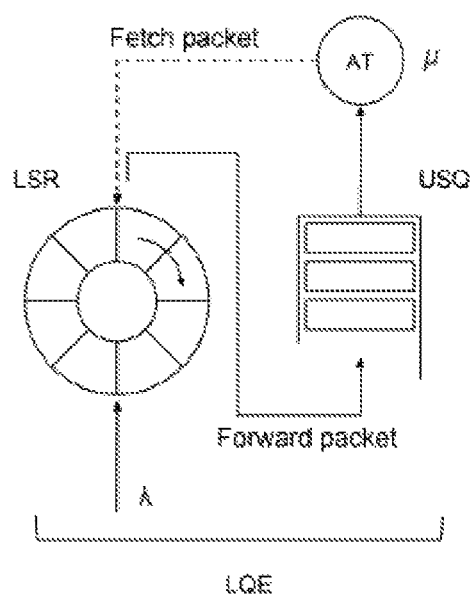
FIG. 2 depicts an embodiment of a network system in which the arriving packets destined for a particular application are dispatched by a hardware-implemented dispatcher to that application, where the application maintains a queue for the packets received by the application.

With reference to FIG. 2, in some network systems, the dispatcher is implemented in hardware and, a respective small, fixed size, but fast hardware storage structure/LSR is provided for each application. While the hardware dispatcher may operate at the peak packet-arrival rate and add the arriving packets in the respective LSRs of each application, the packet consumption rate of one or more applications may be less than the peak packet-arrival rate. Therefore, as in the configuration described with reference to FIG. 1, each application/AT may employ a respective USQ. Here, however, each application/AT performs some of the operations otherwise performed by the DT in the configuration described with reference to FIG. 1. Specifically, each AT retrieves the packets from the corresponding LSR and places them into the corresponding USQ. Subsequently, each AT may retrieve the packets from the corresponding USQ and may consume them. Though FIG. 2 depicts only one application and the corresponding LSR and USQ, more than one applications and the corresponding LSRs and USQs are contemplated.

In some cases, if the application were to perform all of the operations associated with the consumption of a packet before the next packet is retrieved from the USQ, the packet consumption rate may drop to a level so low that some packets received by the application would need to be dropped. Also, it may not always be necessary to perform all of the operations for each packet. For example, in intrusion detection, some packets can be readily identified as safe or unsafe by simply examining the source/origin of the packet, and determining that the source/origin is either trusted (indicating that the packet is safe) or is known to be malicious (indicating that the packet is unsafe). Only for those packets where the source/origin is neither trusted nor known to be malicious, a further analysis may be needed, which can be performed in one or more additional processing stages. In general, performing packet analysis/consumption in two or more stages can minimize the likelihood of dropping the arriving packets.

Figure 3:
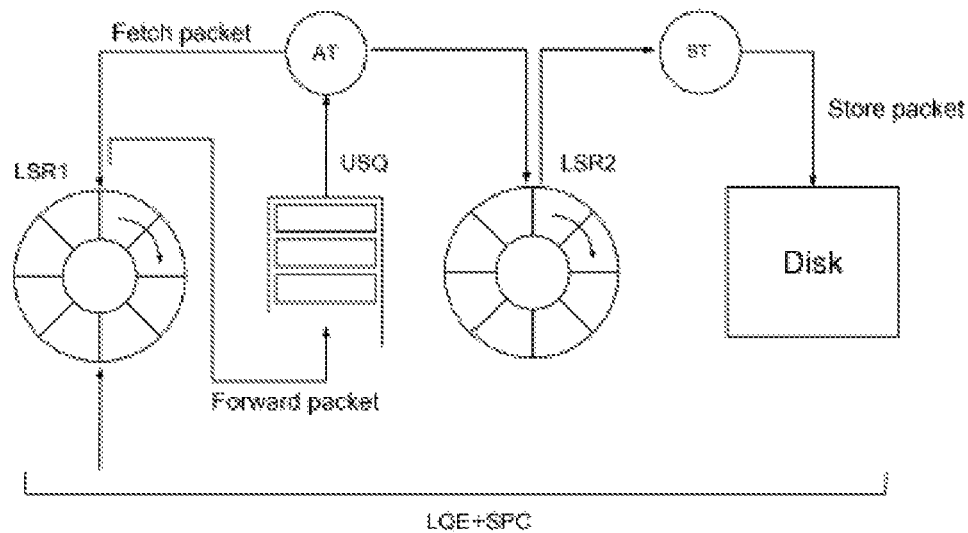
FIG. 3 depicts an embodiment of the described invention, where the application consumes the received packets in two stages, the first stage being a producer stage and the second stage being a consumer stage, and maintains a storage/queue accessed simultaneously by both the producer and consumer stages.

An implementation of a two-stage (multi-stage, in general) packet processing is depicted in FIG. 3. The AT retrieves a packet from a limited-size storage structure (LSR1) and places it in the USQ. The AT may then retrieve the packet from the USQ and perform the first stage of the packet analysis/consumption. Thereafter, the AT would insert the packet in another limited-size storage structure (LSR2). A limited size storage structure is generally preferred because the overhead of adding and retrieving packets from such a structure is typically lower than that of a software implemented queue or storage structure. For example, the size of the LSR2 may range from 1 kilobytes up to 10 gigabytes. Due to the limited size of LSR2, however, if LSR2 becomes full, the AT may remove one or more previously added packets from LSR2 to make room for the new packet(s) to be added, or may overwrite one or more previously added packets. Typically, the oldest packet(s) are removed/overwritten.

In some implementations, the AT may determine whether additional stage(s) of packet analysis/consumption is/are needed, prior to adding the packets to LSR2. In various embodiments, however, this determination is not performed prior to adding the packets to LSR2 and, as such, all the packets that are extracted from the USQ are added to LSR2. In some cases, not the AT but some other process/processor may determine whether additional packet analysis/processing is needed, and this determination may be made after the packets are added to LSR2. Such a configuration of the network system can minimize the number of operations on the AT's critical path and can improve its performance.

After the AT or another process determines that one or more of the packets added to LSR2 must be analyzed/processed further, a process/thread called selective packet capture thread (ST) retrieves the packets from LSR2 and consume them, either partially or fully. This process/thread is called selective packet capture (SPC) because it would typically process/consume, at least partially, only a selected subset of the packets added to LSR2, i.e., the subset of packets that need further analysis/processing.

FIG. 3 depicts that the ST retrieves and simply stores the packets. This is for illustration only. In general, in various embodiments the ST may perform one or more of: further packet analysis, packet rendering, packet forwarding, packet discarding, packet storage, etc. In some cases, after retrieving the packets from LSR2, the ST may first insert them in another USQ, e.g., USQ2 (not shown), may subsequently retrieve them from the other USQ, and may then consume them. In some embodiments, the ST may perform only a partial consumption of the packets and, thereafter, may place them in yet another limited size data structure, e.g., LSR3 (not shown). Thereafter, another process/thread, e.g., ST2 (not shown) could consume at least some of the packets added to LSR3.

In various embodiments, the application thread or another process has the capability to trigger a packet capture operation at any time. For instance, the application can decide upon processing a packet that a cybersecurity attack is being carried out and would trigger the capture operation in order to save a batch of packets on the disk, allowing for a more detailed offline analysis of the suspicious packets. With reference to FIG. 3, upon triggering a packet capture operation, the SPC thread (ST) wakes up, transfers a specified amount of packets from LSR2 to the disk and then goes back to sleep. In some cases, the ST continues to store the packets on the disk until the trigger signal is withdrawn or until the ST receives a signal to enter the sleep mode.

The subsystem formed by the application thread (AT), the LSR2, and the SPC thread (ST) define a traditional consumer-producer problem, but with one caveat: the consumer is not always active. This implies that the limited-size storage (LSR) needs to support two different modes of operation, one in which the consumer is sleeping, and does not pull any packets from the LSR, and another one in which the consumer is awake and actively pulls packets from the LSR. The traditional consumer-producer implementation does not readily support the operation of a consumer that is not always active. Various embodiments described herein feature a high-performance storage structure/queue supporting two modes of operation of the consumer without using locks that would negatively affect the performance of the network system. We refer to this storage structure as a lockless bimodal queue (LBQ).

Figure 4:
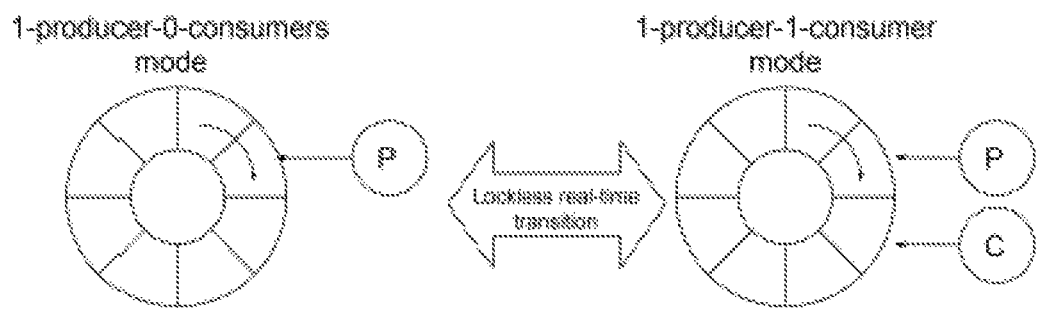
FIG. 4 schematically depicts the operation of the storage/queue shown in FIG. 3, when a producer-consumer system accessing the storage/queue changes the mode of the consumer.

With reference to FIG. 4, in one mode of operation, the consumer is in the sleep mode and, as such, only the producer accesses the LSR, where the producer would add packets to the LSR. When the LSR becomes full, the producer would remove the previously entered packet(s) and add new packet(s) or may overwrite the previously entered packet(s). In another mode of operation, the consumer is in the awake mode, and both the producer and the consumer access the LSR simultaneously. Neither the producer nor the consumer locks the LSR during their respective accesses. The producer adds new packets to the LSR and, simultaneously, the consumer retrieves them. Any corruption of the packets is avoided as shown in a process entitled "Lockless 1-producer-1-consumer queue" listed in FIG. 5.

Specifically, the producer and the consumer both maintain respective indices/pointers to the LSR, depicted as "P" and "C," respectively, in FIG. 4. The index/pointer "P" indicates the last location in the LSR at which the latest new packet was added and, after the insertion of that packet, "P" indicates the location in the LSR at which the next packet would be added. The index/pointer "C" indicates the location in the LSR from which the next packet is to be retrieved and, after the packet retrieval, the location in the LSR from which another packet would be retrieved. In Lockless 1-producer-1-consumer queue listed in FIG. 5, these indices/pointers are "offset_p" and "offset_c," respectively. Because the LSR is of a fixed size, once the last location of the LSR is accessed, the indices/pointers P and C would wrap-around, and restart with the first location of the LSR, as described at lines 8 and 11 for the producer, and line 18 for the consumer.

In Lockless 1-producer-1-consumer queue, the producer executes the process "enqueue" and the consumer simultaneously executes the process "dequeue." As such, the producer continually inserts new packets in the LSR (as line 10 describes) and, simultaneously, the consumer continually retrieves the previously inserted packets (as line 19 describes). If, however, the location identified by the index/pointer "next_offset_p," i.e., the location next to the location where a new packet is to be inserted by the producer, and the location "offset_c," i.e., the location from which a packet would be retrieved by the consumer, are the same, as line 9 describes, the producer stalls, to avoid packet corruption. Here, all the locations in the LSR except for one location, identified by "offset_p" where a packet would be added next, are occupied and contain previously inserted packets that have not been retrieved by the consumer. As such, the LSR is considered to be "full" (i.e., all but one locations in the LSR are occupied), and the producer is stalled, as line 9 describes. The producer would remain stalled until this condition persists, i.e., the insertion of additional packet(s) is suspended until the consumer retrieves one or more packets. After the consumer retrieves another packet, the value of "offset_c" would change, and the producer would resume adding new packets to the LSR.

Similarly, if the location "offset_p," i.e., the location at which the producer would insert a new packet or the location at which the next new packet would be inserted, and the location "offset_c," i.e., the location from which a packet would be retrieved by the consumer, are the same, as line 15 describes, there are no packets in the LSR that were not retrieved already, i.e., the LSR does not contain any unconsumed packets. In this case, the consumer does not retrieve any packets, as line 16 describes. After the producer adds another packet to the LSR, the value of "offset_p" would change, and then the consumer would resume retrieving packets from the LSR.

Thus, the operation of Lockless 1-producer 1-consumer queue assumes that the producer and the consumer are always active. Otherwise, i.e., if the consumer sleeps, the consumer would not retrieve any packets from the LSR, which would become full, as described above. Then, the producer would stall, and would not be able add any more packets until the consumer wakes up again, because the sleeping consumer would never retrieve any packets and, as such, there would be no room for the new packets. The selective capture of packets described above, does however, contemplate the consumer switching between the awake and sleep modes, and the producer must not stall while the consumer is sleeping. Therefore, the process listed in FIG. 5 is not suitable for selective capture of packets (SCP).

In order to devise a process that would facilitate SCP, i.e., accommodate a consumer that wakes up and consumes packets when needed and sleeps otherwise, we considered the extreme case in which the consumer always sleeps. This scenario likely has no practical application, but we formulated a solution for this extreme case, which then served as a basis for a solution for SCP. With reference to FIG. 6, it can be seen that the solution for the extreme case, entitled "Lockless 1-producer 0-consumer queue" is quite similar to the Lockless 1-producer 1-consumer queue, except for one important difference.

In Lockless 1-producer 0-consumer queue, when the LSR is "full," i.e., when the location identified by the index/pointer "next_offset_p," i.e., the location next to the location where a new packet is to be inserted by the producer, and the location "offset_c," i.e., the location from which a packet would be retrieved by the consumer, are the same (as described in line 9), the producer does not stall. Instead, as described in line 10, the producer invokes the "dequeue" process. As such, a packet would be retrieved from the LSR, making room for the producer to store an additional packet. In this way, the producer mimics the consumer. The producer does not consume, however, the retrieved packet, and that packet may simply be discarded.

In some embodiments, the Lockless 1-producer 0-consumer queue process is modified such that not just one but a specified number of packets (e.g., a few, tens, hundreds, etc.) may be retrieved and discarded. In some embodiments, the Lockless 1-producer 0-consumer queue process is modified such that when the condition in line 9 is true, the producer simply overwrites one or more packets that were previously inserted in the LSR and that the consumer would have retrieved, had the consumer been awake.

We use the technique of mimicking the consumer by the producer when the LSR is "full" to facilitate the selective capture of packets (SCP), i.e., to accommodate a consumer that wakes up and consumes packets when needed and sleeps otherwise. Notice, however, that while both the Lockless 1-producer-1-consumer and the Lockless 1-producer-0-consumer processes require no locks, these processes do not address a consumer switching modes. In particular, in Lockless 1-producer-1-consumer processes, the producer would stall if the consumer were to sleep, as described above and, in Lockless 1-producer-0-consumer processes, both the producer and consumer would invoke the dequeue process if the consumer were to wake up, which would corrupt the LSR.

To facilitate SCP, we still need to resolve the problem of allowing access to the LSR as the consumer transitions between the two modes of operation, i.e., from the sleep mode to the wake-up mode, and vice versa. Moreover, to minimize any performance penalties, it is important to ensure such transitions can happen without locking the LSR. We describe two solutions to achieve this objective. The first solution requires no special hardware-aided operation but assumes the producer is always active, in order to avoid starvation of the consumer. The second solution is not limited by such a requirement, but requires using compare-and-swap (CAS), a hardware-aided operation supported by many modern processors.

With reference to FIGS. 7A and 7B, the process entitled "Lockless bimodal queue using request/acknowledgment" (LBQ1) does not employ the CAS mechanism and, instead, uses a request/acknowledgment mechanism. For a correct functioning of this process, i.e., to avoid consumer starvation, the producer must always be active. In the LBQ1 process, two new processes, start_c( ) and stop_c( ) are introduced and they are to be invoked by the consumer right after it wakes up and right before it goes back to sleep, respectively. After invoking start_c( ) the consumer would invoke the dequeue process. Using a two-way handshake implemented using the flags req and ack, the consumer and the producer synchronize the transition from one operational mode to another, where the need for locks is avoided because the memory locations of the two flags are shared, i.e., they are accessible to the producer and the consumer both. In this process, only the consumer may modify the "req" flag and only the producer may modify the "ack" flag, but the producer can read the "req" flag and the consumer can read the "ack" flag.

When the consumer wakes up, it sets the "req" flag to true, and when the consumer is about to sleep, it sets the "req" flag to false. As such, by reading this flag, the producer determines the current mode of the consumer. If the consumer is sleeping, the producer acknowledges by setting the "ack" flag to false (line 13). Thereafter, if the LSR is "full," the producer retrieves a packet, as described with reference to the Lockless 1-producer-0-consumer queue process, making room for a packet to be inserted (lines 14 and 15). If the consumer is awake, the producer acknowledges by setting the "ack" flag to true (line 19). In this case, if the LSR is "full" the producer does not retrieve any packets. Instead, the producer stalls and waits for the consumer to retrieve one or more packets and to make room for new packets to be inserted (line 20). After a producer retrieves a packet (when the consumer is in the sleep mode) and after the consumer itself retrieves a packet (when the consumer is awake), there is room in the LSR for one or more new packets. As such, the producer inserts new packet(s) into the LSR (lines 22 and 23). When the consumer is awake, after executing the start_c( ) process, the consumer executes the dequeue process and operates in the same way as in the Lockless 1-producer-1-consumer queue process.

Notice that in the LBQ1 process, both the producer and the consumer can invoke the dequeuer process—the producer would do so when the consumer is in the sleep mode and when the LSR is "full," and the consumer would do so when it is awake, to retrieve and consume the packet(s) in the LSR. If the consumer is in the awake mode but if the producer is not yet aware of the correct mode of the consumer, e.g., because the producer read the "req" location just before the consumer changed it, both the producer and consumer may invoke the dequeue process, which can cause corruption of the LSR.

To avoid this, in the LBQ1 process, the consumer must wait for an acknowledgment from the producer when the consumer indicates a mode change in the start_c( ) and stop_c( ) processes. Specifically, the consumer would stall at lines 36 and 41, respectively, until the producer acknowledges the mode of the consumer, i.e., until the producer invokes enqueue( ) and executes either line 19 to acknowledge that the consumer's mode is awake, or executes line 13, to acknowledge that the consumer's mode is sleep.

Once the consumer receives the producer's acknowledgment, it is ensured that the producer and the consumer would not invoke the dequeue process at the same time. This ensures that the LSR would not be corrupted. If the producer sleeps, however, the consumer would stall at lines 36 or 41 until the producer wakes up and provides the required acknowledgment. Therefore, in embodiments of the LBQ1 process, consumer starvation could occur, i.e., the consumer would not retrieve and consume any packets, if it switches modes while the producer is sleeping. To avoid such a starvation, the embodiments of the LBQ1 process assume that the producer is always awake or active. In the context of high performance computing and network processing, such embodiments are often suitable because many applications operate using producers that are indeed always active and enqueuing packets to the LSR and, as such, the assumption that the producer needs to be active always is satisfied.

For applications that need not be constrained by this assumption, however, we replace the two-way handshake operation with a compare-and-swap instruction cas( ) to control the transition from one operational mode to another of both the producer and the consumer. The cas( ) operation/function is an atomic operation, i.e., once started, all of its steps are completed and the operation is not interrupted until all the steps are completed. Upon completion, the cas( ) function returns a Boolean result: true or false, which indicates whether a swap was performed. Invoking the cas( ) operation/function involves specifying a memory location, an old value, and a new value. If the current value of the specified memory location is not the same as the old value, the value of the memory location remains unchanged and the cas( ) function returns the Boolean result false. Otherwise, i.e., if the current value of the specified memory location is the same as the old value, the value of the memory location is swapped, i.e., the old value is replaced with the new value, and the cas( ) function returns the Boolean result true.

With reference to FIGS. 8A and 8B, describing the process Lockless bimodal queue using CAS (LBQ2), the memory location specified to the cas( ) operation is "trans," indicating a mode transition. The memory location "trans" is a shared memory location, i.e., accessible to the producer and consumer both, and is associated with the LSR. Initially, the location "trans" is set to the value false. When the consumer wakes up, it invokes the process start_c( ) which invokes cas( ) (as described at line 32). During the execution of cas( ) the value of "trans" is switched from false to true. Should the producer wake up simultaneously and invoke the enqueue process, the producer would also invoke cas( ) (as described at line 11). Because the consumer's invocation changed the value of "trans," the producer's later invocation would return the false result and, as such, the producer would stall and invoke cas( ) repeatedly (as described at line 11). Thus, the producer would not proceed to invoke the dequeue process.

The consumer's invocation of cas( ) would return the true result, however, and the consumer would not stall. The consumer would then indicate that it is awake using the shared memory location identified by "state," and then would reset the value of "trans" to false. The consumer would then proceed with executing the dequeue process. Once "trans" is set to false, the producer's next invocation of cas( ) would return the true result, and the producer would no longer be stalled. The producer would continue with the enqueue process, and would recognize that the mode of the consumer is awake (as described at line 12). Therefore, the producer would not invoke the dequeue process while the consumer is in the awake mode and has set the value of the shared memory location "state" accordingly.

In some cases, the producer would wake up and would invoke the enqueue process, which would invoke cas( ). The consumer may wake up simultaneously, i.e., not necessarily at the same exact time when the producer woke up, but while the producer is executing the enqueue process, and would invoke start_c( ) which would also invoke cas( ). In the scenario discussed above, we assumed that the consumer invoked cas( ) before the producer; here we assume that the producer invoked cas( ) before the consumer. Thus, in this scenario, the producer would not stall, because its invocation of cas( ) would return the true result, but the consumer would stall because its later invocation would return the false result (as described at line 32).

While stalled, the consumer would repeatedly invoke cas( ) as described at line 32). The consumer would not be able to indicate that it is now in the awake mode, and would not invoke the dequeue process. The producer, however, would continue with its execution of the enqueue process and may invoke the dequeue process if the LSR is "full." Thus, in this scenario, the producer may invoke the dequeue process, but the consumer may not. After the producer's execution of the dequeue process is completed, the producer would reset trans to "false" (as described at line 18). The next invocation of cas( ) by the consumer would then return true and the consumer would continue with executing the dequeue process. But now, the producer would not invoke the dequeue process when the consumer is executing it, as described in the first scenario.

Thus, the use of the cas( ) operation/function ensures that the producer and consumer would not invoke the dequeue process simultaneously. Because embodiments of the LBQ2 process do not require the consumer to wait for an acknowledgment from the producer, the producer can also switch between the awake and sleep modes, without causing consumer starvation. The rest of the operations performed in the LBQ2 process are similar to those performed in the LBQ1 process. According to both the LBQ1 and LBQ2 processes, the total number of packets a consumer can retrieve and consume from the LSR after it wakes up and before it goes to sleep for the first time after waking up is not limited by the size of the LSR, and can be greater than the size of the LSR, including multiples thereof. The reason is, according to these processes, the producer can continually add new packets to the LSR without locking it and the consumer can simultaneously retrieve and consume packets from the LSR continually, without locking it, as long as the locations from which and/or adjacent to which the packets are to be inserted and retrieved are not the same.

While the two processes, namely, LBQ1 and LBQ2, are described using certain specific codes including certain functions and programming-language constructs, it should be understood that these codes are illustrative only. In general, in both processes, the producer typically adds new packets to a limited size storage, and the consumer, when it is in the awake mode, simultaneously retrieves and consumes packets from the limited size storage. The consumer also informs the producer of the consumer's mode. If the consumer is in the sleep mode, and if the limited size storage is "full," i.e., all but one locations of the storage include newly added, unconsumed packets, the producer either retrieves one or more packets from the storage, discards those packet(s), and inserts new packets, or overwrites one or more packets in the storage with the new packets.

If the consumer is in the awake mode, the consumer may retrieve and consume packets, as long as there are unconsumed packets, and the producer may continue to insert new packets as long as the locations where the a new packet is to be inserted is not the same as or adjacent to a location from which the consumer would retrieve a packet. Suitable implementations of these and other operations described with reference to FIGS. 7A-8B are contemplated in many different programming languages and such implementations may employ any suitable programming constructs. Some operations may also be implemented in hardware.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for selectively consuming packets in a packet stream, the method comprising:
   receiving by a consumer in a sleep mode, a wake-up signal to transition to an awake mode and, in response:
      alerting a producer, via a shared memory location accessible to both the consumer and the producer, that the consumer has entered the awake mode; and
      if a lockless storage structure accessible to both the consumer and the producer comprises one or more unconsumed packets, retrieving and consuming, using a consumer pointer to the lockless storage structure, at least one unconsumed packet while allowing the producer simultaneous access to the storage structure via a producer pointer and, otherwise, providing a signal indicating that the storage structure contains no unconsumed packets; and
   simultaneously allowing insertion by the producer one or more new packets into one or more empty locations in the storage structure, the one or more empty locations being identified by the producer pointer, when the storage structure is not full.

2. The method of claim 1, further comprising:
   receiving by the consumer an acknowledgment from the producer to the alert,
   wherein the retrieving and consuming steps are performed only after receiving the acknowledgment.

3. The method of claim 1, further comprising determining whether the storage structure contains an unconsumed packet.

4. The method of claim 1, further comprising:
   receiving by the consumer a sleep signal and, in response alerting the producer, via the shared memory location, that the consumer has entered the sleep mode; and
   inserting by the producer one or more new packets into one or more empty locations in the storage structure if the storage structure is not full, and, otherwise, inserting the one or more new packets into one or more occupied locations in the storage structure.

5. The method of claim 4, wherein inserting the one or more new packets into one or more occupied locations in the storage structure comprises retrieving and discarding one or more packets from the one or more occupied locations.

6. The method of claim 4, wherein inserting the one or more new packets into one or more occupied locations in the storage structure comprises overwriting one or more previously inserted packets in the one or more occupied locations.

7. The method of claim 1, wherein consuming the one or more unconsumed packets comprises one or more of: processing, forwarding, or storing the one or more unconsumed packets.

8. The method of claim 1, wherein the storage structure comprises a storage ring.

9. The method of claim 1, wherein the storage structure comprises a limited size storage structure, having a size from 1 kilobytes up to 10 gigabytes.

10. The method of claim 9, wherein the number of unconsumed packets retrieved and consumed by the consumer after the wake-up signal is received and before subsequently receiving any sleep signal is greater than the size of the storage structure.

11. The method of claim 1, wherein a producer location index and a consumer location index are associated with the storage structure, the method comprising one or more of:
determining by the producer, using the producer location index and the consumer location index, whether the storage structure is full; and
determining by the consumer, using the producer location index and the consumer location index, whether the storage structure contains an unconsumed packet.

12. The method of claim 1, wherein:
the shared memory location comprises a mode flag indicating whether the consumer is awake or sleeping;
only the consumer is configured to modify the mode flag; and
the producer is configured only to read the mode flag.

13. The method of claim 1, wherein:
the shared memory location further comprises an acknowledgment flag indicating whether the producer is aware of whether the consumer is awake or sleeping;
only the producer is configured to modify the acknowledgment flag; and
the consumer is configured only to read the acknowledgment flag.

14. The method of claim 1, wherein the shared memory location comprises a flag that indicates: (i) a mode transition of the producer and (ii) a mode transition of the consumer, the flag being controlled via a hardware-implemented, atomic compare-and-swap operation.

15. A system for selectively consuming packets in a packet stream, the system comprising:
a first processor; and
a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to execute a consumer process simultaneously with a producer process, wherein:
the consumer process programs the processing unit to receive in a sleep mode, a wake-up signal to transition to an awake mode and, in response:
alert the producer process, via a shared memory location accessible to both the consumer and the producer processes, that the consumer process has entered the awake mode; and
if a lockless storage structure accessible to both the consumer and the producer processes comprises one or more unconsumed packets, to retrieve and consume, using a consumer pointer to the lockless storage structure, at least one unconsumed packet while allowing the producer process simultaneous access to the storage structure via a producer pointer and, otherwise, to provide a signal indicating that the storage structure contains no unconsumed packets; and
the consumer process allows the producer process to insert, simultaneously with the consumer process, one or more new packets into one or more empty locations in the storage structure, the one or more empty locations being identified by the producer pointer, when the storage structure is not full.

16. The system of claim 15, wherein the consumer process programs the processing unit to:
receive an acknowledgment from the producer process to the alert; and
to perform the retrieve and consume operations only after receiving the acknowledgment.

17. The system of claim 15, wherein the consumer process programs the processing unit to determine whether the storage structure contains an unconsumed packet.

18. The system of claim 15, wherein:
the consumer process programs the processing unit to receive a sleep signal and, in response to alert the producer process, via the shared memory location, that the consumer process has entered the sleep mode; and
the producer process programs the processing unit to insert one or more new packets into one or more empty locations in the storage structure if the storage structure is not full and otherwise, to insert the one or more new packets into one or more occupied locations in the storage structure.

19. The system of claim 18, wherein to insert the one or more new packets into one or more occupied locations in the storage structure, the producer process programs the processing unit to retrieve and discard one or more packets from the one or more occupied locations.

20. The system of claim 18, wherein to insert the one or more new packets into one or more occupied locations in the storage structure, the producer process programs the processing unit to overwrite one or more previously inserted packets in the one or more occupied locations.

21. The system of claim 15, wherein to consume the one or more unconsumed packets, the instructions program the processing unit to one or more of: process, forward, or store the one or more unconsumed packets.

22. The system of claim 15, wherein the storage structure comprises a storage ring.

23. The system of claim 15, wherein the storage structure comprises a limited size storage structure, having a size from 1 kilobytes up to 10 gigabytes.

24. The system of claim 23, wherein the number of unconsumed packets retrieved and consumed by the consumer process after the wake-up signal is received and before subsequently receiving any sleep signal is greater than the size of the storage structure.

25. The system of claim 15, wherein:
a producer location index and a consumer location index are associated with the storage structure; and
one or more of:
the producer process programs the processing unit to determine, using the producer location index and the consumer location index, whether the storage structure is full; and
the consumer process programs the processing unit to determine, using the producer location index and the consumer location index, whether the storage structure contains an unconsumed packet.

26. The system of claim 15, wherein:
the shared memory location comprises a mode flag indicating whether the consumer is awake or sleeping;
only the consumer process programs the processing unit to modify the mode flag; and
the producer process programs the processing unit only to read the mode flag.

27. The system of claim 15, wherein:
the shared memory location further comprises an acknowledgment flag indicating whether the producer is aware of whether the consumer is awake or sleeping;
only the producer process programs the processing unit to modify the acknowledgment flag; and
the consumer process programs the processing unit only to read the acknowledgment flag.

28. The system of claim 15, wherein the shared memory location comprises a flag that indicates: (i) a mode transition of the producer and (ii) a mode transition of the consumer, the flag being controlled via a hardware-implemented, atomic compare-and-swap operation.

* * * * *

UNITED STATES PATENT AND TRADEMARK OFFICE
CERTIFICATE OF CORRECTION

| | | |
|---|---|---|
| PATENT NO. | : 11,005,772 B2 | Page 1 of 1 |
| APPLICATION NO. | : 16/189489 | |
| DATED | : May 11, 2021 | |
| INVENTOR(S) | : Jordi Ros-Giralt et al. | |

It is certified that error appears in the above-identified patent and that said Letters Patent is hereby corrected as shown below:

In the Specification

At Column 1, Line 15, insert:
-- STATEMENT OF GOVERNMENT SUPPORT
This invention was made with government support under Award No. DE-SC0017184 awarded by the U.S. Department of Energy. The government has certain rights in the invention. --

Signed and Sealed this
Second Day of August, 2022

*Katherine Kelly Vidal*

Katherine Kelly Vidal
*Director of the United States Patent and Trademark Office*